(12) United States Patent
Borkowski et al.

(10) Patent No.: US 12,146,538 B2
(45) Date of Patent: Nov. 19, 2024

(54) SYSTEMS AND METHODS FOR MANUFACTURING WEAR PADS

(71) Applicant: GOODRICH CORPORATION, Charlotte, NC (US)

(72) Inventors: Luke Borkowski, West Hartford, CT (US); Tahany Ibrahim El-Wardany, Vernon, CT (US); Leslie Steele, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 507 days.

(21) Appl. No.: 17/483,394

(22) Filed: Sep. 23, 2021

(65) Prior Publication Data

US 2023/0093175 A1    Mar. 23, 2023

(51) Int. Cl.
| | |
|---|---|
| *F16D 65/12* | (2006.01) |
| *B22F 7/06* | (2006.01) |
| *B23K 26/352* | (2014.01) |
| *B33Y 80/00* | (2015.01) |
| *B22F 10/25* | (2021.01) |
| *B33Y 10/00* | (2015.01) |
| *F16D 65/02* | (2006.01) |

(52) U.S. Cl.
CPC ............ *F16D 65/123* (2013.01); *B22F 7/064* (2013.01); *B23K 26/355* (2018.08); *B33Y 80/00* (2014.12); *B22F 10/25* (2021.01); *B22F 2998/10* (2013.01); *B33Y 10/00* (2014.12); *F16D 2065/1364* (2013.01); *F16D 2065/1392* (2013.01); *F16D 2200/0004* (2013.01); *F16D 2200/006* (2013.01); *F16D 2250/0046* (2013.01)

(58) Field of Classification Search
CPC ........... F16D 65/12; F16D 65/123–128; F16D 2065/1364; F16D 2065/1392; F16D 2200/0004; F16D 2200/006; F16D 2250/0046; B33Y 80/00; B33Y 10/00; B23K 26/355; B22F 7/064; B22F 10/25; B22F 2998/10
USPC ................................................... 188/218 XL
See application file for complete search history.

(56) References Cited

U.S. PATENT DOCUMENTS

| | | | |
|---|---|---|---|
| 4,511,021 | A | 4/1985 | Grider |
| 5,242,746 | A | 9/1993 | Bommier et al. |
| 5,612,110 | A | 3/1997 | Watremez |
| 9,976,612 | B2 | 5/2018 | Tremblay |
| 10,436,265 | B2 | 10/2019 | Stevenson |

(Continued)

FOREIGN PATENT DOCUMENTS

| | | |
|---|---|---|
| DE | 102018130798 | 6/2020 |
| EP | 3372862 | 9/2018 |
| JP | 2009063072 | 3/2009 |

OTHER PUBLICATIONS

European Patent Office, European Search Report dated Sep. 20, 2019 in Application No. 16161575.2.

(Continued)

*Primary Examiner* — Christopher P Schwartz
(74) *Attorney, Agent, or Firm* — SNELL & WILMER L.L.P.

(57) ABSTRACT

A manufacturing process may comprise: stacking a plurality of friction discs together, each friction disc comprising a lug defining a surface; and depositing a composition to bond to the surface of a first friction disc in the plurality of friction discs to form a wear pad defining a wear surface.

17 Claims, 7 Drawing Sheets

(56) References Cited

U.S. PATENT DOCUMENTS

| | | | |
|---|---|---|---|
| 11,867,243 B2* | 1/2024 | Potapenko | C23C 24/103 |
| 2006/0156978 A1 | 7/2006 | Lipson | |
| 2006/0269766 A1* | 11/2006 | Swank | F16D 13/683 |
| | | | 428/469 |
| 2007/0084047 A1 | 4/2007 | Ange | |
| 2010/0276236 A1 | 11/2010 | Kim et al. | |
| 2012/0222306 A1 | 9/2012 | Mittendorf | |
| 2014/0163717 A1 | 6/2014 | Das | |
| 2015/0080495 A1 | 3/2015 | Heikkila | |
| 2016/0158842 A1 | 6/2016 | Urbanski | |
| 2016/0279710 A1 | 9/2016 | Whittle et al. | |
| 2018/0093414 A1 | 4/2018 | Martino | |
| 2019/0105735 A1* | 4/2019 | Brunhuber | B23K 26/361 |
| 2021/0222745 A1 | 7/2021 | Spray et al. | |
| 2023/0136257 A1* | 5/2023 | Utsch | B23K 26/40 |
| | | | 219/76.1 |

OTHER PUBLICATIONS

Extended European Search Report dated Aug. 2, 2016 in European Application No. 16161575.2.

Ford, S. "Additive manufacturing technology: potential implications for US manufacturing competitiveness." 2014. United Stated International Trade Commission. Journal of international commerce and economics. p. 1-35.

Jul. 2015 update appendix 1 :examples. 2015. p. 14-19.

M.J. Donachie and S.J. Donachie, Superalloys, Metals Handbook Desk Edition, ASM International, 1998, p. 394-414.

USPTO, Requirement for Restriction/Election dated Sep. 14, 2016 in U.S. Appl. No. 14/668,394.

USPTO, Preinterview First Office Action dated Dec. 8, 2016 in U.S. Appl. No. 14/668,394.

USPTO, Non-Final Rejection dated Mar. 14, 2017 in U.S. Appl. No. 14/668,394.

USPTO, Final Rejection dated Aug. 24, 2017 in U.S. Appl. No. 14/668,394.

USPTO, Advisory Action dated Nov. 15, 2017 in U.S. Appl. No. 14/668,394.

USPTO, Advisory Action dated Dec. 12, 2017 in U.S. Appl. No. 14/668,394.

USPTO, Non-Final Rejection dated Jan. 14, 2020 in U.S. Appl. No. 14/668,394.

European Patent Office, European Search Report dated Jan. 24, 2023 in Application No. 22195801.0.

* cited by examiner

SYSTEMS AND METHODS FOR MANUFACTURING WEAR PADS

FIELD

The present disclosure relates to additive manufacturing and, more specifically, to systems and methods for manufacturing wear pads in brake assemblies.

BACKGROUND

Conventional aircraft wheel assemblies comprise rotating and stationary discs which stop the aircraft when compressed together. Typically, sacrificial rotor clips are coupled to brake rotor disc lugs to protect the rotor discs from excessive wear. Rotor clips are typically made of cobalt-chromium alloys and are discarded when wear exceeds allowable limits. Cobalt-chromium alloys are expensive when compared to other metals such as stainless steel. Further, rotor clips may be attached via rivets, which utilize drilled apertures through the rotor disc, which can damage fibers of a carbon composite matrix and/or cause stress concentrations. Additionally, riveting of rotor clips may be time consuming, unstable and contribute to manufacturing, assembly time, increased part count, and increased brake costs.

SUMMARY

A manufacturing process is disclosed herein. The manufacturing process may comprise: stacking a plurality of friction discs together, each friction disc comprising a lug defining a surface; and depositing a composition to bond to the surface of a first friction disc in the plurality of friction discs to form a wear pad defining a wear surface.

In various embodiments, depositing the composition comprises depositing the composition via one of directed energy deposition or wire arc additive manufacturing. Depositing the composition may include generating a functionally graded structure on the surface. The manufacturing process may further comprise texturing the surface prior to depositing the composition. The surface may be textured via a laser beam emitted from a laser source. The depositing of the composition may include forming a molten deposit pool via directing the laser source towards the surface and depositing a powder on the surface. The manufacturing process may further comprise depositing the composition to bond to a second surface of a second friction disc, the second friction disc disposed adjacent to the first friction disc in the plurality of friction discs. A first friction surface of the first friction disc may abut a second friction surface of a second friction disc in the plurality of friction discs.

A manufacturing process is disclosed herein. The manufacturing process may comprise: texturing a surface of a lug of a friction disc via a laser source; and depositing a composition on the surface to form a wear pad defining a wear surface.

In various embodiments, depositing the composition may further comprise forming a molten deposit pool via directing the laser source towards the surface and depositing a powder on the surface. The powder may form a molten deposit pool in response to being contacted by a laser beam of the laser source, the molten deposit pool configured to flow into a textured surface formed via texturing the surface. The molten deposit pool may bond to the textured surface. The manufacturing process may further comprise stacking a plurality of friction discs together prior to texturing the surface, the plurality of friction discs including the friction disc. The manufacturing process may further comprise depositing the composition on a plurality of lugs for each friction disc in the plurality of friction discs. The plurality of lugs may be spaced apart along a radial surface of the friction disc. The wear surface may be configured to interface with one of a torque bar or a torque plate in a brake assembly. The friction disc may comprise a fiber reinforced carbon or ceramic matrix composite, and the composition may comprise a metal alloy.

A friction disc is disclosed herein. The friction disc may comprise: an annular structure and a plurality of lugs, each lug in the plurality of lugs extending radially from the annular structure, the plurality of lugs being spaced apart; and a plurality of wear pads, each wear pad defining a wear surface configured to interface with one of a spline, a torque bar, or a torque plate, each wear pad in the plurality of wear pads being bonded to a surface of a lug in the plurality of lugs.

In various embodiments, the annular structure comprises a fiber reinforced carbon or ceramic matrix composite, and wherein each wear pad in the plurality of wear pads comprises a metal alloy. A first wear pad in the plurality of wear pads may be spaced apart from a second wear pad in the plurality of wear pads, the first wear pad and the second wear pad defining a channel therebetween configured to receive the spline, the torque bar, or the torque plate.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
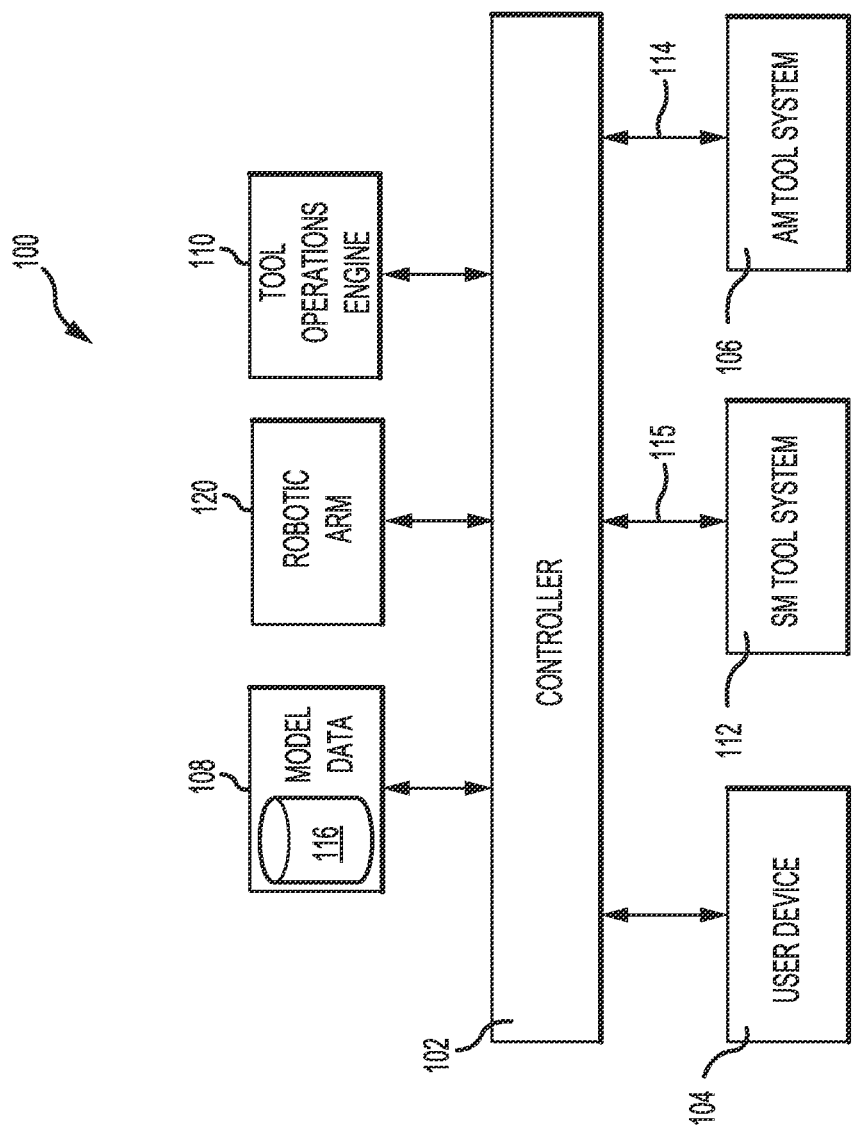
FIG. 1 illustrates a system for generating a plurality of wear pads for a friction disc assembly, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein refers to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Three-dimensional object printing (3D printing) is an additive process in which one or more ejector heads eject successive layers of material on a substrate in different shapes. The substrate is supported either on a platform that can be moved three dimensionally by operation of actuators operatively connected to the platform, or the ejector heads are operatively connected to one or more actuators for controlled movement of the ejector heads to produce the layers that form the object. 3D printing is distinguishable from traditional object-forming techniques, which mostly rely on the removal of material from a work piece by a subtractive process, such as cutting or drilling.

Ceramic matrix composites (CMCs) offer a higher temperature, lower density alternative to metallic parts. These CMC parts are often attached to or interface with adjacent metallic structures or parts. For example, in the case of carbon fiber-reinforced/carbon matrix (C/C) CMC brakes, metallic clips/covers are attached to CMC disc lugs in contact with the mating metallic components (stationary torque tube and rotating wheel drive key). These clips serve to manage the interface between the CMC brake disc and the metallic brake assembly components by increasing the toughness and wear capability of the joint and providing reinforcement. Attaching the metal clips via rivets to the discs typically utilize drilled holes through the C/C CMC rotor disc, which can damage the fibers and cause stress concentrations. Thus, the C/C CMC rotor disc may have a weakened load-bearing section of the brake. In addition, riveting of the clips, or clip attaching hardware, may be time consuming and unstable (i.e., can result in clip cracking). Additionally, the large quantity of clips contributes to manufacturing and assembly time, part count, and material and brake cost. Further, removal of the clips for reuse may be difficult, time consuming, and expensive.

With reference to FIG. 1, a block diagram of a system 100 for additively manufacturing a plurality of wear pads is illustrated according to various embodiments. System 100 may comprise a controller 102, a user device 104, an Additive Manufacturing (AM) tool 106, a database 108, a subtractive manufacturing (SM) tool 112, and/or a robotic arm 120. System 100 may further comprise a tool operations engine 110.

In various embodiments, controller 102 may be configured as a central network element or hub to access various systems, engines, and components of system 100. Controller 102 may comprise a network, computer-based system, and/or software components configured to provide an access point to various systems, engines, and components of system 100. Controller 102 may be in operative and/or electronic communication with user device 104, AM tool 106, database 108, tool operations engine 110, SM tool 112, and/or robotic arm 120. Controller 102 may comprise any suitable combination of hardware, software, and/or database components. For example, controller 102 may comprise one or more network environments, servers, computer-based systems, processors, databases, and/or the like. Controller 102 may comprise at least one computing device in the form of a computer or processor, or a set of computers/processors, although other types of computing units or systems may be used, such as, for example, a server, web server, pooled servers, or the like. Controller 102 may also include one or more data centers, cloud storages, or the like, and may include software, such as APIs, SDKs, etc. configured to retrieve and write data to the user device 104, AM tool 106, database 108, tool operations engine 110, SM tool 112, and/or robotic arm 120. In various embodiments, controller 102 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, user device 104 may enable a user to interact with system 100 to upload model files, edit model files, control the AM tool 106, control the SM tool 112, generate and/or print structures and the like. User device 104 may comprise any suitable combination of hardware, software, and/or database components. For example, user device 104 may comprise at least one computing device in the form of a computer or processor, or a set of computers/processors, although other types of computing units or systems may be used. The processor may be configured to implement various logical operations in response to execution of instructions, for example, instructions stored on a non-transitory, tangible, computer-readable medium, as discussed further herein. For example, user device 104 may comprise a computer or processor, or a set of computers, processor, and/or application specific integrated circuits (ASICs), although other types of computing units or system may also be used. Exemplary computing devices may include servers, pooled servers, laptops, notebooks, hand held computers, personal digital assistants, cellular phones, smart phones (e.g., IPHONE®, BLACKBERRY®, ANDROID®, etc.), tablets, wearables (e.g., smart watches, smart glasses, etc.), Internet of things (IoT) devices, or any other device capable of receiving data over a network. User device 104 may comprise an operating system, such as, for example, a WINDOWS® mobile operating system, an ANDROID® operating system, APPLE® IOS®, a BLACKBERRY® operating system, and the like.

In various embodiments, AM tool system 106 may comprise hardware and/or software configured to perform additive manufacturing operations to generate additively manufactured component, a structure, a workpiece, and/or the like in response to instructions from a controller. AM tool system 106 may be configured to communicate with controller 102 and receive tool instructions 114 from controller 102. In various embodiments, AM tool system 106 may comprise a 3D printing machine, a material jetting machine, a material extrusion machine, a directed energy deposition (DED) machine, a wire arc additive manufacturing (WAAM) machine, and/or the like.

Similarly, in various embodiments, SM tool system 112 may comprise hardware and/or software configured machine tools to perform subtractive manufacturing operations to machine the additively manufactured component to size and produce wear pads with desired surface finish as described further herein. For example, the SM tool system 112 may be configured to generate a surface texture to facilitate bonding (e.g., cross-hatching or the like). SM tool system 112 may be configured to communicate with controller 102 and receive tool instructions 115 from controller 102. In various embodiments, SM tool system 112 may comprise a laser (e.g., an ND: YAG Laser), or the like. Although illustrated as including an SM tool system 112 configured to facilitate a surface texture to facilitate bonding, the present disclosure is not limited in this regard. For example, the system 100 may be utilized without an SM tool system 112, in accordance with various embodiments. In various embodiments, the SM tool system 112 may be a part of the AM tool system 106 (hybrid AM/SM machine tool). For example, if the AM tool system 106 is a DED machine, the AM tool system 106 may include a laser, which could be utilized for texturing the surface or finish the surface (e.g., via selected patterns such as cross-hatching, dimple forming, etc.).

In various embodiments, database 108 may comprise any number of data elements or data structures such as, for example, model data 116. Database 108 may be configured to store data using any suitable technique described herein or known in the art. Database 108 may be configured to store digital models and data related to digital models of a structure or work piece as model data 116. The model data 116 may include design files (e.g., initial design files, final design files, production design files, etc.) defining one or more structures.

In various embodiments, the tool operations engine 110 may be configured to generate the tool instructions 114, 115 from controller 102 based on the model data 116. In various embodiments, a tool instruction 114, 115 may comprise data such as instructions for AM tool paths, SM tool paths, G-codes, M-codes, layered additive programs, and/or the like.

Figure 2:
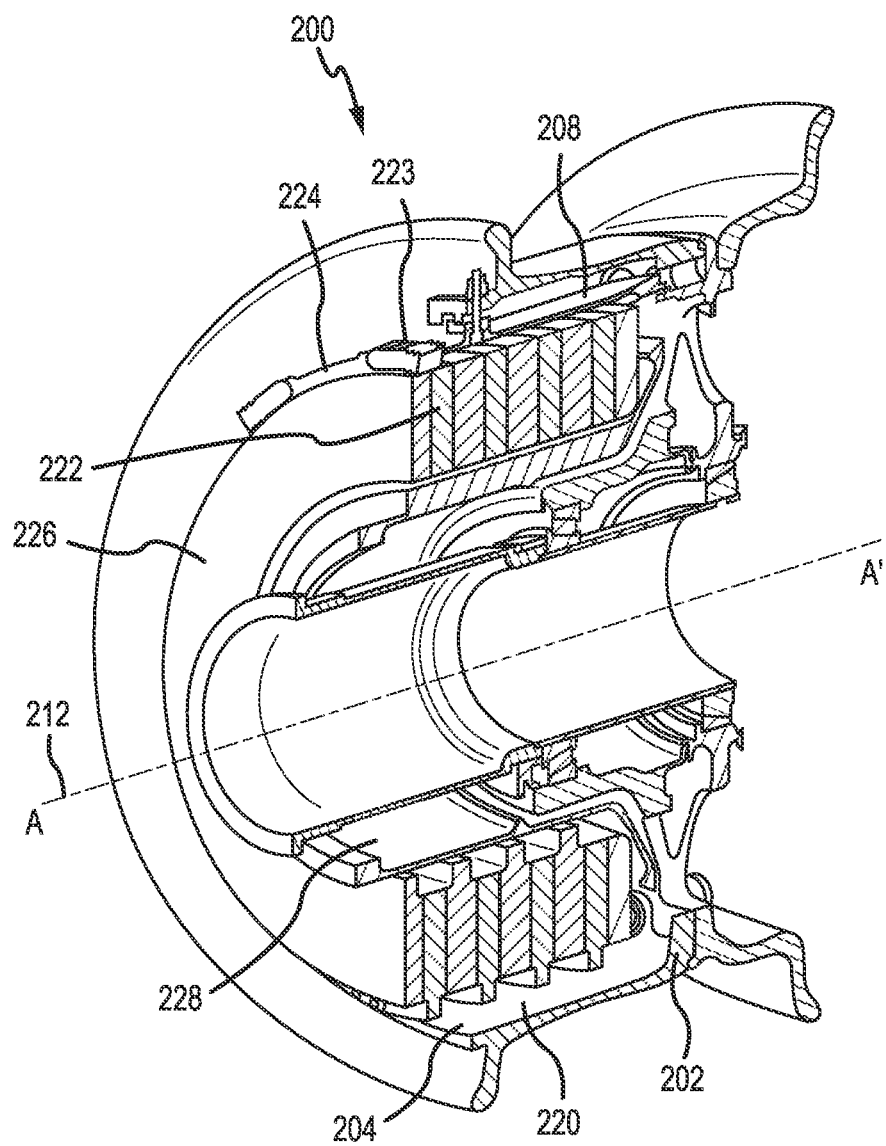
FIG. 2 illustrates a perspective cross-sectional view of a wheel and brake assembly, in accordance with various embodiments.
Figure 3:
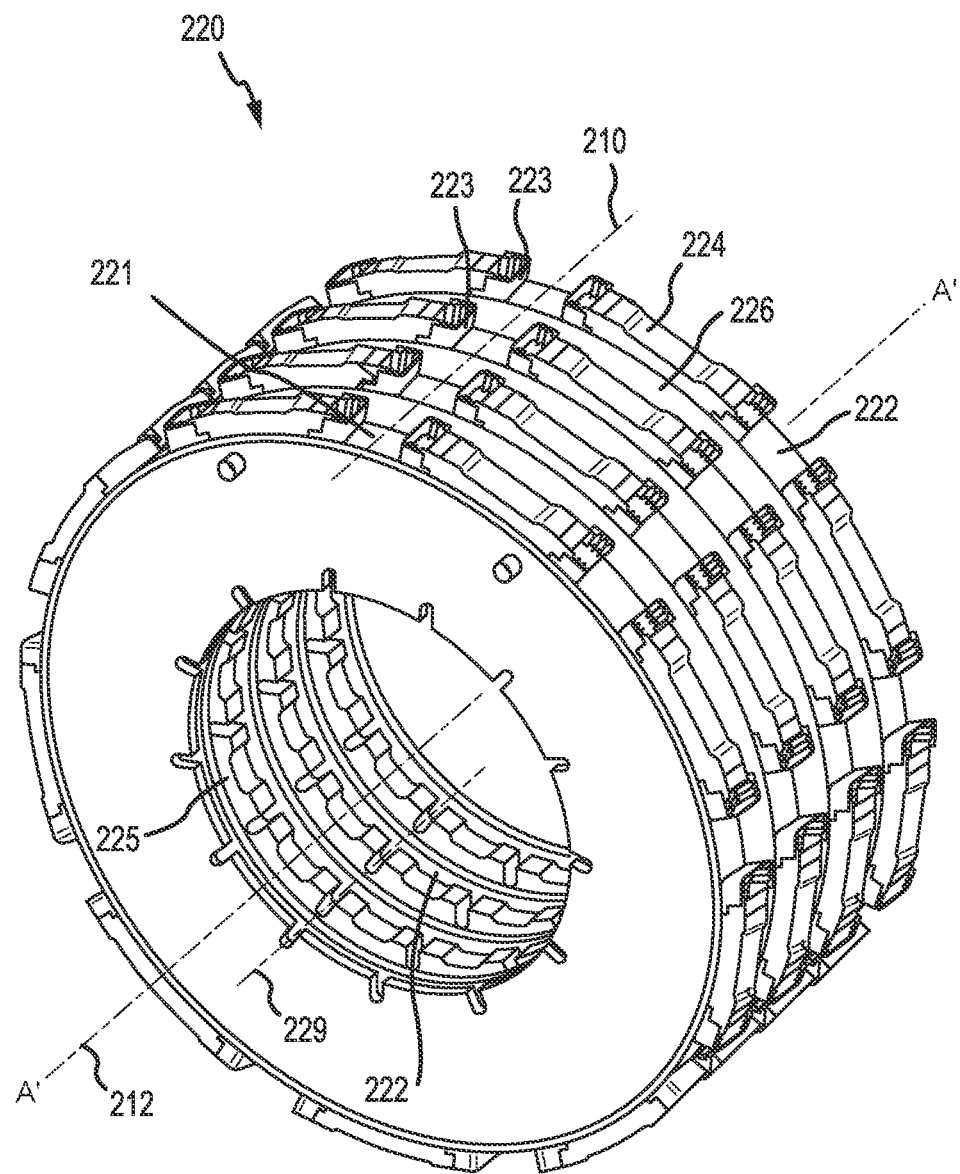
FIG. 3 illustrates a brake stack for a wheel and brake assembly, in accordance with various embodiments.

Referring now to FIGS. 2 and 3, in accordance with various embodiments, a wheel and brake assembly 200 may comprise a wheel 202 having a radially inner surface 204. A plurality of torque bars 208 are oriented parallel to an axis of rotation 212 and are radially coupled to the radially inner surface 204 of wheel 202. A brake assembly is disposed within wheel 202. The brake assembly comprises a brake stack 220 oriented about axis of rotation 212. Brake stack 220 may comprise a plurality of alternating stators 226 (i.e., friction discs) and rotor discs 222 (i.e., friction discs).

In various embodiments, rotor disc 222 may comprise an annular structure 221. The rotor disc 222 may further comprise a plurality of rotor disc lugs 224 disposed on an outer diameter defined by the annular structure 221 of the rotor disc 222. When rotor discs 222 are similarly oriented about axis of rotation 212, they may define a plurality of torque bar channels 210. In various embodiments, torque bars 208 may be disposed in torque bar channels 210 and may be configured to engage with rotor discs 222 as wheel 202, torque bars 208, and rotor discs 222 rotate about axis of rotation 212.

In various embodiments, stators 226 may be stationary and may be coupled to torque plate 228. Torque plate 228 may comprise a plurality of splines on its outer diameter. In various embodiments, stator 226 may comprise a plurality of stator lugs 225 disposed on an inner diameter of stator 226. When stators 226 are similarly oriented about axis of rotation 212, they may define a plurality of torque plate spline channels 229. In various embodiments, splines may be disposed in torque plate spline channels 229 and may be configured to couple stators 226 to torque plate 228, thereby preventing rotation of stators 226.

In various embodiments, actuation of the brake assembly may cause the application of force to brake stack 220 in an axial direction—that is, from A to A' along axis of rotation 212—thereby causing compression of brake stack 220 along A to A'. In various embodiments, compression of brake stack 220 may slow the rotation of rotor discs 222, torque bars 208, and wheel 202.

In various embodiments, brake assembly 200 may further comprise a plurality of wear pads 223. Wear pads 223 may be coupled to rotor disc lugs 224. In various embodiments, wear pads 223 may be disposed between rotor disc lugs 224 and torque bar 208 and/or between rotor disc 222 and torque bar 208. During compression of brake stack 220 and deceleration of rotor discs 222, torque bars 208, and wheel 202, high compression and torque loads may be transferred to and/or through wear pads 223, causing wear. In various embodiments, wear pads 223 may be subject to vibration and heat, causing wear. In various embodiments, wear pads 223 may protect rotor discs 222 and rotor disc lugs 224 from excessive wear. In various embodiments, wear pads 223 may be coupled to the rotor disc lugs 224 of the rotor discs via processes described further herein.

In various embodiments, brake assembly 200 may comprise a plurality of stator wear pads. Stator wear pads may be disposed on stator lugs 225 and/or may couple stators 226 to torque plate 228. Stator wear pads may protect stator lugs 225, stators 226, and/or torque plate 228 from excessive wear. Thus, although disclosed herein with respect to wear pads 223 of a rotor disc assembly, the present disclosure is not limited in this regard. For example, coupling stator wear pads to stator lugs 225 in accordance with processes disclosed herein is within the scope of this disclosure.

In various embodiments, wear pads 223 and/or other sacrificial components may comprise a cobalt-chromium alloy. In various embodiments, the cobalt-chromium alloy may comprise any combination of metals such as cobalt, nickel, iron, aluminum, boron, carbon, chromium, manganese, molybdenum, phosphorus, sulfur, silicon, and/or titanium. In various embodiments, wear pads 223 may comprise a cobalt-chromium alloy having favorable wear characteristics, including high temperature, friction, and compression allowances. For example, a cobalt-chromium alloy, such as that sold under the trademark Stellite®, which is available from Kennametal Inc. of Pittsburgh, Pennsylvania may be utilized, in accordance with various embodiments. In various embodiments, wear pads and/or other sacrificial components may comprise any suitable metal or metal alloy, such as a stainless-steel alloy, a nickel alloy, steel alloy, or the like. The present disclosure is not limited in this regard. In various embodiments, the processes disclosed herein may further facilitate material development for use in wear pads 223. For example, metal matrix composites, such as titanium carbide or any mixture of cobalt based alloys, nickel-based alloys, iron-based alloys, or the like are within the scope of this disclosure.

In various embodiments, with reference back to FIG. 1, the AM tool system 106 may comprise a plurality of extrusion nozzles as a part of a powder feed system, multiple wires in response to a wire arc AM tool 106, or the like. Thus, a blended, or graded, structure for the wear pads 223 is within the scope of this disclosure to control various properties (i.e., mechanical, chemical, thermal) for the wear pads 223 via feeding various metal alloys and/or carbon through the extrusion nozzles.

Figure 4A:
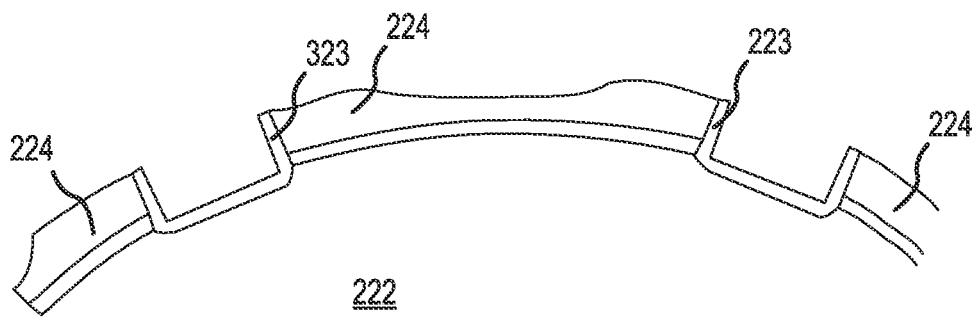
FIG. 4A illustrates a front view of a friction disc assembly, in accordance with various embodiments.
Figure 4B:
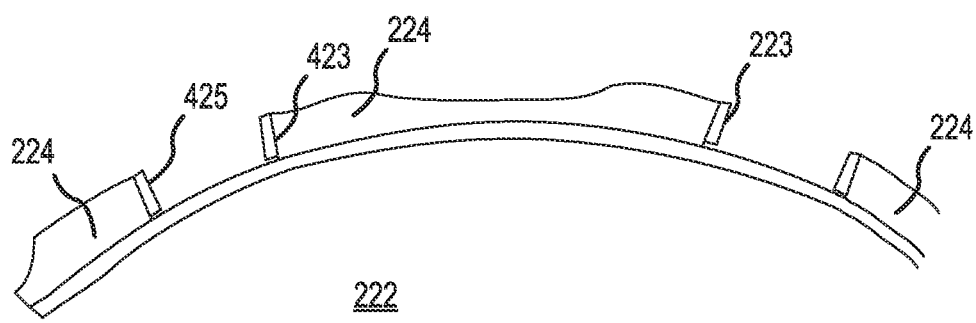
FIG. 4B illustrates a front view of a friction disc assembly, in accordance with various embodiments.

Referring now to FIGS. 4A and 4B, a portion of a rotor disc 222 with wear pads 223 manufactured in accordance with the processes described further herein is illustrated, in accordance with various embodiments. In various embodiments, the processes performed by system 100 from FIG. 1, as described further herein may facilitate simpler wear pad shapes and remove fasteners (e.g., rivets) from a rotor disc assembly. For example, as described further herein, system 100 may be configured to additively manufacture wear pads 223 and bond the wear pads 223 directly to rotor disc lugs 224. For example, as described further herein, system 100 may be configured to bond a single wear pad (e.g., wear pad 323 between adjacent rotor disc lugs 224 (e.g., FIG. 4A), bond distinct wear pads between adjacent rotors (e.g., wear pad 423 coupled to a first circumferential side of a first rotor disc lug and wear pad 425 coupled to a second circumferential side of a second rotor disc lug in FIG. 4B). The present disclosure is not limited in this regard. One skilled in the art may recognize various ways to reduce overall material of wear pads via the system 100 and associated processes described further herein.

Figure 5:
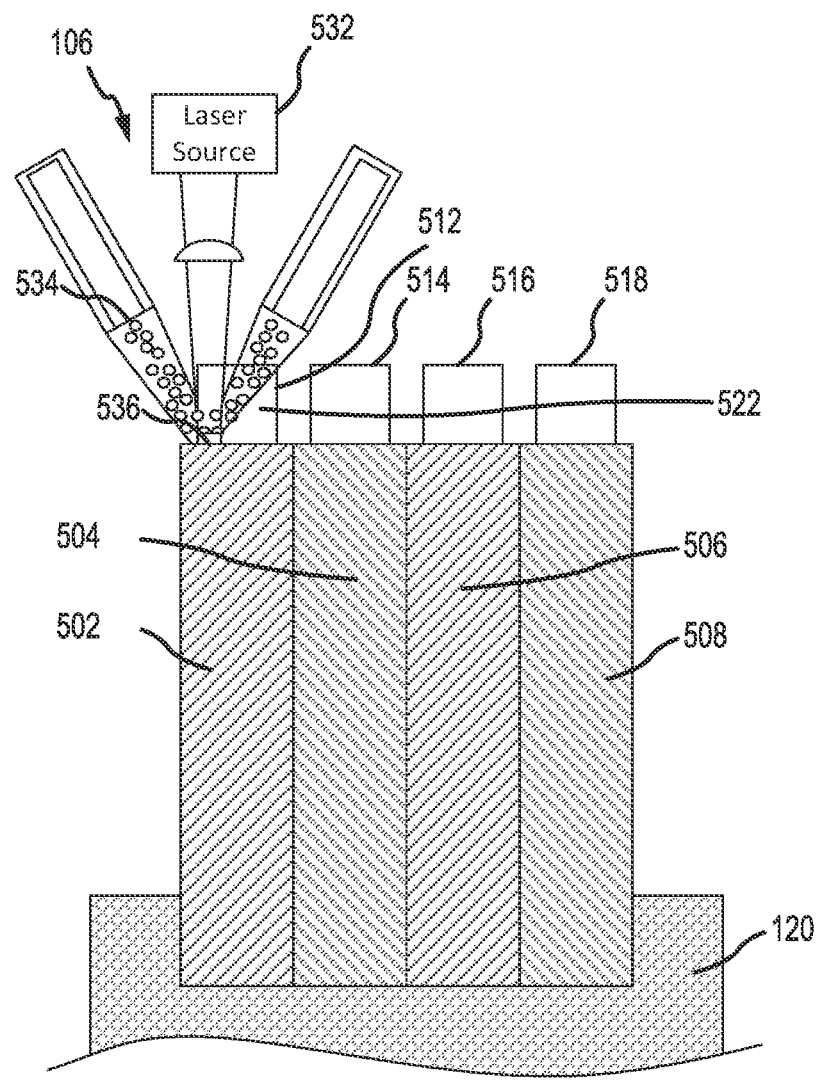
FIG. 5 illustrates a schematic view of a process from FIG. 6, in accordance with various embodiments.

Referring now to FIG. 5, a stack of rotor discs (e.g., rotor discs 502, 504, 506, 508) during a manufacturing process via system 100 from FIG. 1 is illustrated, in accordance with various embodiments. In various embodiments, a plurality of rotor discs (e.g., rotor discs 502, 504, 506, 508) may be stacked together prior to performing manufacturing process 600 from FIG. 6 (e.g., via a robotic arm 120 or the like). In this regard, rotor disc wear pads may be deposited in succession for various rotor disc lugs (e.g., rotor disc lugs 512, 514, 516, 518) for a brake assembly 200 from FIGS. 2 and 3. Wear pads for a plurality of rotor disc lugs (e.g., rotor disc lugs 512, 514, 516, 518) for a plurality of rotor discs (e.g., rotor discs 502, 504, 506, 508) for a brake assembly 200 may be manufactured in a single process (e.g., process 600 from FIG. 6). Stated another way, manufacturing process 600 from FIG. 6 may be a bulk manufacturing process for any number of rotor discs, in accordance with various embodiments.

Figure 6:
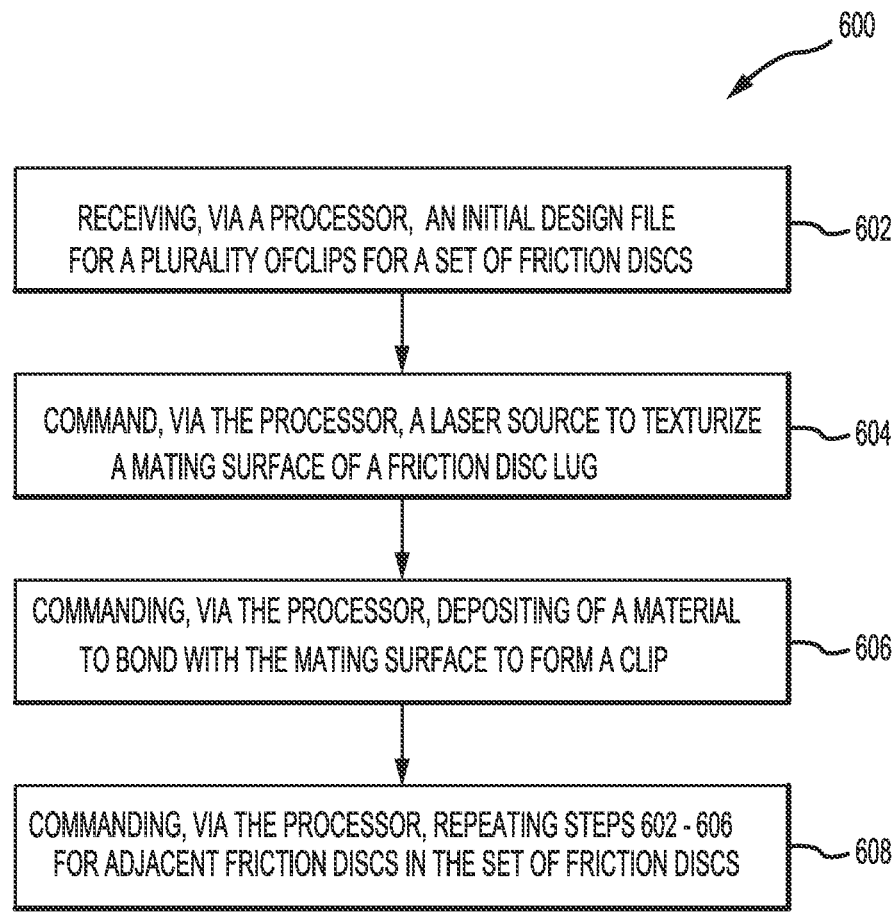
FIG. 6 illustrates a process of generating a plurality of wear pads for a friction disc assembly, in accordance with various embodiments.

Furthermore, by clamping friction surfaces of the rotor discs (e.g., rotor discs 502, 504, 506, 508) together (e.g., via the robotic arm 120) during the manufacturing process 600 from FIG. 6, a contamination risk of friction surface may be greatly reduced.

In various embodiments, the AM tool system 106 is a DED machine comprising a laser source 532 and a powder delivery nozzle 534. In various embodiments, the powder delivery nozzle 534 may be configured to dispense converging powder streams towards a deposit location. In various embodiments, the laser source 532 is configured to emit a focused laser beam (e.g., via lens 536) towards the deposit location prior to depositing the converging powder streams to the deposit location. In this regard, a molten deposit pool 538 may be formed at the deposit location. In various embodiments, a mating surface of each lug (e.g., circumferential surface 522 of rotor disc lug 512) may be a porous surface (i.e., having a predetermined surface roughness) to facilitate mechanical adhesion of the molten deposit pool 538 to the mating surface of a respective lug (e.g., circumferential surface 522 of rotor disc lug 512). In various embodiments, the laser source 532 may be configured to generate a surface texture on the mating surface 522 prior to depositing a powder through powder delivery nozzle 534. In this regard, the mating surface 522 of rotor disc lug 512 may be texturized prior to deposition of a respective wear pad as described further herein.

Although described herein with respect to a DED machine for the AM tool system 106, the present disclosure is not limited in this regard. For example, the AM tool system 106 may comprise a wire arc additive manufacturing tool, or any other additive manufacturing tool known in the art. For an additive manufacturing tool not having a laser source, a distinct laser source may be utilized from the AM tool system 106 to provide the texturing described previously herein. In various embodiments, the texturing may comprise dimple texturing, cross-hatching, S-shape, or any other texturing of material surfaces. The present disclosure is not limited in this regard.

Referring now to FIG. 6, a process flow chart for a manufacturing process 600 to be performed by system 100 from FIG. 1 is illustrated in accordance with various embodiments. The process 600 comprises receiving, via a processor (e.g., controller 102), an initial design file for a plurality of wear pads to be manufactured for a set of friction discs (step 602). The set of friction discs may be stacked together in accordance with FIG. 5. In this regard, the friction surfaces of the respective friction discs may be protected from contamination. Any number of friction discs is within the scope of this disclosure. For example, the stack of friction discs may comprise a number of rotor discs corresponding to a brake assembly 200 from FIG. 2, a number of stator discs corresponding to the brake assembly 200 from FIG. 2, or the like. In various embodiments, the number of friction discs may be less than or greater than the number of rotor discs corresponding to the brake assembly 200 from FIG. 2. The present disclosure is not limited in this regard.

In various embodiments, the initial design file may be stored in database 108 of system 100. The initial design file may include a design shape for each wear pad in a plurality of wear pads to be manufactured, as well as coordinates of each wear pad during manufacturing.

In various embodiments, the process 600 further comprises commanding, via the processor, a laser source to emit a laser beam to texture a mating surface of a friction disc lug (step 604). In various embodiments, texturing the mating surface may include texturing the surface to any shape to facilitate mechanical adhesion during deposition of a material being deposited. For example, texturing the mating surface may include generating dimples, cross-hatching, S-shape(s), etc. The present disclosure is not limited in this regard. In various embodiments, a porosity of the mating surface may be sufficient to facilitate bonding without step 604, in accordance with various embodiments.

In various embodiments, the process 600 further comprises commanding, via the processor, depositing of a material to bond with the mating surface to form a wear pad (e.g., a wear pad 223 from FIGS. 2 and 3) (step 606). The material may be deposited via a DED machine as illustrated in FIG. 5, a wire arc additive manufacturing (WAAM) machine, or the like. The present disclosure is not limited in this regard. In various embodiments, depositing the material may comprise depositing a plurality of subsequent layers. The deposition may include a single metal or alloy, discrete metallic layers, discrete metallic and/or composite layers, a functionally graded structure (e.g., a first material followed by a second material, etc.), or the like. In this regard, depositing of the material may further comprise regulating a deposited metal composition to control mechanical, thermal, and/or chemical properties of the wear pad for the friction disc.

In various embodiments, in response to utilizing a DED machine in accordance with FIG. 5, a molten deposit pool 538 from FIG. 5 may be generated during the depositing step 606 of process 600. In various embodiments, the molten deposit pool 538 may comprise a relatively small diameter (e.g., 0.7 mm to 3 mm in diameter). In this regard, the DED machine of FIG. 5 may be relatively accurate and precise, thus reducing potential contamination during process 600.

In various embodiments, due to a porosity of the mating surface of the friction disc, the deposited material from step 606 may flow into troughs and/or voids of the mating surface upon melting, thereby promoting mechanical adhesion to the mating surface. In this regard, fasteners may be eliminated from a respective friction disc configuration as illustrated in FIGS. 3 and 4.

In various embodiments, the process 600 may further comprise commanding, via the processor, repeating of steps 602-606 for adjacent friction discs in the set of friction discs (step 608). In this regard, the processor may command a robotic arm (e.g., robotic arm 120 from FIGS. 1 and 5) to move the set of friction discs relative to the AM tool system 106 from FIG. 1 to deposit a plurality of wear pads for the set of friction discs. In various embodiments, wear pads for a first torque bar channel (e.g., torque bar channel 210 from FIG. 3) may be deposited first, then the friction discs may be rotated, and a second torque bar channel (e.g., torque bar channel 210 from FIG. 3) may be deposited second, and so on. In this regard, all wear pads in a plurality of rotor discs for a brake assembly 200, or all stator wear pads in a plurality of stator discs for a brake assembly 200, may be manufactured in a bulk process (e.g., process 600). In this regard, a manufacturing time for wear pads of friction discs may be greatly reduced relative to typical manufacturing systems wear clips, in accordance with various embodiments.

In various embodiments, the robotic arm 120 from FIGS. 1 and 5 may facilitate greater degrees of freedom for system 100 from FIG. 1 during the manufacturing process 600, allowing deposition of more complex shapes and features for the friction disc assembly.

Figure 7:
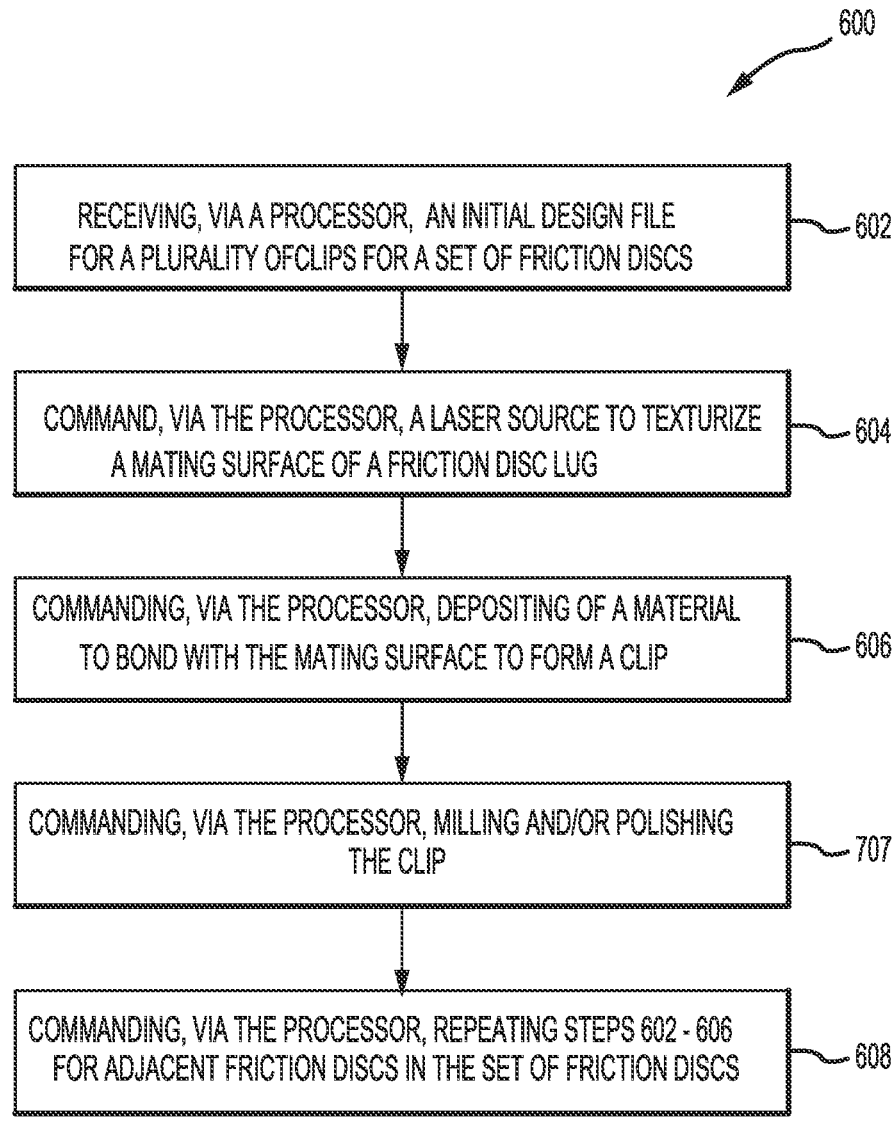
FIG. 7 illustrates a process of generating a plurality of wear pads for a friction disc assembly, in accordance with various embodiments.

In various embodiments, with reference now to FIG. 7, the process 600 may further comprise commanding, via the processor, milling and/or polishing of the wear pad (step 707) after the depositing step 606. In this regard, the SM tool system 112 of FIG. 1 may be deployed to yield a desired shape and a desired finish for the deposited wear pad from step 606. In various embodiments, milling and/or polishing the wear pad in accordance with step 707 may further comprise treating a wear face of the wear pad (e.g., mechanical treatment, laser treatment, compressive treatment, or the like). In this regard, the laser source described previously herein may be utilized.

In various embodiments, the process 600 disclosed herein may facilitate a simplified manufacturing process for wear pads of friction disc assemblies, stronger friction discs, a reduction in part count, and/or a reduction in material, in accordance with various embodiments. In various embodiments, the targeted and controlled deposition disclosed herein may utilize less material as mechanical interface may be eliminated and material utilized for retention (e.g., in floating clip designs) may be eliminated (e.g., as illustrated in FIG. 4B).

In various embodiments, the deposition of metal on the brake surface, as disclosed herein, may provide greater oxidation protection versus a mechanically bonded clip structure. Thus, the need for oxidation protection/coatings can be reduced in these regions, in accordance with various embodiments.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein invokes 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A manufacturing process comprising:
   stacking a plurality of friction discs together, each friction disc comprising a lug defining a surface;
   texturing, via a laser beam emitted from a laser source, the surface to form a textured surface; and subsequently depositing, via a depositing step, a composition to bond to the textured surface of a first friction disc in the plurality of friction discs to form a wear pad that is bonded to the textured surface and defines a wear surface, wherein the depositing the composition includes forming a molten deposit pool via directing the laser source towards the surface and depositing a powder on the textured surface to bond the molten deposit pool thereto.

2. The manufacturing process of claim 1, wherein depositing the composition comprises depositing the composition via one of directed energy deposition or wire arc additive manufacturing.

3. The manufacturing process of claim 1, wherein depositing the composition includes generating a functionally graded structure on the surface.

4. The manufacturing process of claim 1, further comprising depositing the composition to bond to a second surface of a second friction disc, the second friction disc disposed adjacent to the first friction disc in the plurality of friction discs.

5. The manufacturing process of claim 1, wherein a first friction surface of the first friction disc abuts a second friction surface of a second friction disc in the plurality of friction discs.

6. The manufacturing process of claim 1, wherein the friction disc comprises a fiber reinforced carbon or ceramic matrix composite, and wherein the composition comprises a metal alloy.

7. The manufacturing process of claim 1, further comprising:
repeating the depositing step for the lug of each of the plurality of friction discs that are stacked together in a first row; and
repeating the depositing step for the lug of each of the plurality of friction discs that are stacked together in a second row that is disposed adjacent to the first row.

8. A manufacturing process, comprising:
texturing a surface of a lug of a friction disc via a laser source to form a textured surface; and
depositing a composition on the surface to form a wear pad that bonds to the textured surface and defines a wear surface, wherein depositing the composition includes forming a molten deposit pool via directing the laser source towards the surface and depositing a powder on the textured surface to bond the molten deposit pool thereto.

9. The manufacturing process of claim 8, wherein the powder forms a molten deposit pool in response to being contacted by a laser beam of the laser source, the molten deposit pool configured to flow into the textured surface formed via texturing the surface.

10. The manufacturing process of claim 9, wherein the molten deposit pool bonds to the textured surface.

11. The manufacturing process of claim 8, further comprising stacking a plurality of friction discs together prior to texturing the surface, the plurality of friction discs including the friction disc.

12. The manufacturing process of claim 11, further comprising depositing the composition on a plurality of lugs for each friction disc in the plurality of friction discs.

13. The manufacturing process of claim 12, wherein the plurality of lugs are spaced apart along a radial surface of the friction disc.

14. The manufacturing process of claim 8, wherein the wear surface is configured to interface with one of a torque bar or a torque plate in a brake assembly.

15. A friction disc, comprising:
an annular structure and a plurality of lugs, each lug in the plurality of lugs extending radially from the annular structure, the plurality of lugs being spaced apart; and
a plurality of wear pads, each wear pad defining a wear surface configured to interface with one of a spline, a torque bar, or a torque plate, each wear pad in the plurality of wear pads being bonded to a surface of a lug in the plurality of lugs by:
forming a molten deposit pool via directing a laser source towards the surface, and
depositing a powder on the surface.

16. The friction disc of claim 15, wherein the annular structure comprises a fiber reinforced carbon or ceramic matrix composite, and wherein each wear pad in the plurality of wear pads comprises a metal alloy.

17. The friction disc of claim 15, wherein a first wear pad in the plurality of wear pads is spaced apart from a second wear pad in the plurality of wear pads, the first wear pad and the second wear pad defining a channel therebetween configured to receive the spline, the torque bar, or the torque plate.

* * * * *